(12) United States Patent
Error et al.

(10) Patent No.: US 7,603,373 B2
(45) Date of Patent: Oct. 13, 2009

(54) ASSIGNING VALUE TO ELEMENTS CONTRIBUTING TO BUSINESS SUCCESS

(75) Inventors: Brett M. Error, Orem, UT (US); Christopher Reid Error, Orem, UT (US)

(73) Assignee: Omniture, Inc., Orem, UT (US)

( * ) Notice: Subject to any disclaimer, the term of this patent is extended or adjusted under 35 U.S.C. 154(b) by 439 days.

(21) Appl. No.: 10/993,397

(22) Filed: Nov. 18, 2004

(65) Prior Publication Data

US 2005/0114510 A1 May 26, 2005

Related U.S. Application Data

(63) Continuation-in-part of application No. 10/794,809, filed on Mar. 3, 2004.

(60) Provisional application No. 60/452,084, filed on Mar. 4, 2003, provisional application No. 60/452,085, filed on Mar. 4, 2003, provisional application No. 60/523,979, filed on Nov. 20, 2003, provisional application No. 60/536,558, filed on Jan. 14, 2004.

(51) Int. Cl.
*G06F 17/30* (2006.01)
*G06F 7/00* (2006.01)

(52) U.S. Cl. .................. 707/102; 707/101; 707/104.1

(58) Field of Classification Search .............. 707/104.1, 707/10, 3; 709/223; 705/63
See application file for complete search history.

(56) References Cited

U.S. PATENT DOCUMENTS

| | | | |
|---|---|---|---|
| 5,751,283 A | 5/1998 | Smith | |
| 5,760,772 A | 6/1998 | Austin | |
| 5,796,402 A | 8/1998 | Ellison-Taylor | |
| 5,821,931 A | 10/1998 | Berquist et al. | |
| 5,835,087 A | 11/1998 | Herz et al. | |
| 5,870,559 A | 2/1999 | Leshem et al. | |
| 5,966,139 A | 10/1999 | Anupam et al. | |
| 6,008,809 A | 12/1999 | Brooks | |
| 6,026,397 A | 2/2000 | Sheppard | |
| 6,182,097 B1 | 1/2001 | Hansen et al. | |
| 6,188,405 B1 | 2/2001 | Czerwinski et al. | |
| 6,266,649 B1 | 7/2001 | Linden et al. | |
| 6,310,631 B1 | 10/2001 | Cecco et al. | |
| 6,317,787 B1 | 11/2001 | Boyd et al. | |

(Continued)

FOREIGN PATENT DOCUMENTS

WO    WO 00/58866    10/2000

(Continued)

OTHER PUBLICATIONS

U.S. Appl. No. 10/113,808, filed Mar. 29, 2002, Wiles, Jr.

(Continued)

*Primary Examiner*—Kuen S Lu
(74) *Attorney, Agent, or Firm*—Fenwick & West LLP

(57) ABSTRACT

Elements on a website are associated with the business success of the website, such as determined by sales or orders. Contribution of the elements to the business success is accomplished by assignment a fraction of the success value to each element using allocation, participation, and/or allocated participation methods. Reports are generated quantifying website element usage, for example by superimposing color shadings or other visual indicia on a representation of a page of the website.

13 Claims, 6 Drawing Sheets

U.S. PATENT DOCUMENTS

| | | | |
|---|---|---|---|
| 6,393,479 B1 | 5/2002 | Glommen et al. | |
| 6,414,677 B1 | 7/2002 | Robertson et al. | |
| 6,456,305 B1 | 9/2002 | Qureshi et al. | |
| 6,473,102 B1 | 10/2002 | Rodden et al. | |
| 6,473,738 B1 * | 10/2002 | Garrett | 705/26 |
| 6,486,882 B1 * | 11/2002 | Wolverton et al. | 345/475 |
| 6,489,968 B1 * | 12/2002 | Ortega et al. | 715/713 |
| 6,654,036 B1 | 11/2003 | Jones | |
| 6,671,711 B1 * | 12/2003 | Pirolli et al. | 709/200 |
| 6,704,016 B1 | 3/2004 | Oliver et al. | |
| 6,754,873 B1 * | 6/2004 | Law et al. | 715/208 |
| 6,766,370 B2 | 7/2004 | Glommen et al. | |
| 6,850,988 B1 * | 2/2005 | Reed | 709/238 |
| 6,862,574 B1 | 3/2005 | Srikant et al. | |
| 6,912,534 B2 | 6/2005 | DeBettencourt et al. | |
| 6,950,993 B2 | 9/2005 | Breinberg | |
| 6,963,874 B2 | 11/2005 | Kasriel et al. | |
| 6,968,511 B1 | 11/2005 | Robertson et al. | |
| 6,980,962 B1 * | 12/2005 | Arganbright et al. | 705/26 |
| 7,085,682 B1 | 8/2006 | Heller et al. | |
| 2002/0040395 A1 | 4/2002 | Davis et al. | |
| 2002/0042750 A1 * | 4/2002 | Morrison | 705/26 |
| 2002/0087621 A1 | 7/2002 | Hendriks | |
| 2002/0091591 A1 | 7/2002 | Tsumura et al. | |
| 2002/0093529 A1 | 7/2002 | Daoud et al. | |
| 2002/0099812 A1 | 7/2002 | Davis et al. | |
| 2002/0143662 A1 * | 10/2002 | Clark et al. | 705/27 |
| 2002/0152284 A1 | 10/2002 | Cambray et al. | |
| 2002/0165936 A1 | 11/2002 | Alston et al. | |
| 2002/0186237 A1 * | 12/2002 | Bradley et al. | 345/736 |
| 2002/0186253 A1 | 12/2002 | Rodden et al. | |
| 2002/0198939 A1 | 12/2002 | Lee et al. | |
| 2003/0023712 A1 | 1/2003 | Zhao et al. | |
| 2003/0025737 A1 | 2/2003 | Breinberg | |
| 2003/0055883 A1 | 3/2003 | Wiles, Jr. | |
| 2003/0110249 A1 | 6/2003 | Buus et al. | |
| 2003/0128231 A1 | 7/2003 | Kasriel et al. | |
| 2003/0131097 A1 | 7/2003 | Kasriel et al. | |
| 2004/0049417 A1 * | 3/2004 | Nickerson et al. | 705/10 |
| 2004/0059746 A1 | 3/2004 | Error et al. | |
| 2004/0133671 A1 * | 7/2004 | Taniguchi | 709/224 |
| 2004/0174397 A1 | 9/2004 | Cereghini et al. | |
| 2004/0205157 A1 * | 10/2004 | Bibelnieks et al. | 709/218 |
| 2004/0225687 A1 | 11/2004 | Larsson et al. | |
| 2005/0044508 A1 | 2/2005 | Stockton | |
| 2005/0204307 A1 | 9/2005 | Nadal | |
| 2005/0229110 A1 | 10/2005 | Gegner et al. | |
| 2005/0235222 A1 | 10/2005 | Barbanson et al. | |
| 2005/0273727 A1 | 12/2005 | Barbanson et al. | |
| 2006/0143162 A1 | 6/2006 | Bernacki et al. | |
| 2006/0271671 A1 | 11/2006 | Hansen | |

FOREIGN PATENT DOCUMENTS

| | | |
|---|---|---|
| WO | WO 02/23438 A2 | 3/2002 |

OTHER PUBLICATIONS

U.S. Appl. No. 10/113,322, filed Mar. 29, 2002, Zhao et al.
U.S. Appl. No. 10/057,513, filed Jan. 25, 2002, Alston et al.
U.S. Appl. No. 09/835,112, filed Apr. 13, 2001, Cambray et al.
Hong, J. et al., "WebQuilt: A Framework for Capturing and Visualizing the Web Experience," WebQuilt, homepage: http://guir.berkeley.edu/projects/webquilt/, May 1-5, 2001, pp. 1-8.
Notification of International Search Report and Written Opinion, PCT/US04/06898, Feb. 9, 2005, 8 pages.
Notification of International Search Report and Written Opinion, PCT/US04/06696, Feb. 28, 2005, 9 pages.
Extended European Search Report, European Application No. EP 06772307.2, Jan. 12, 2009, 9 pages.
Extended European Search Report, European Application No. EP06826800.2, Jan. 12, 2009, 8 pages.
"WebTrends 7 Report User's Guide," Mar. 2005, pp. I-VIII, 1-82, [Online] [Retrieved on Dec. 15, 2008] Retrieved from the Internet<URL:http://product.webtrends.com/WRC/7.1/Documents/ReportUsersGuide.pdf>.
"WebTrends Guide to Web Analytics," Jan. 2005, pp. I-X, 1-224, [Online] [Retrieved on Dec. 15, 2008] Retrieved from the Internet<URL:http://product.webtrends.com/WRC/7.1/Documents/WebAnalytics.pdf>.
Chinese Second Office Action, Chinese Application No. 200480034359.5, Mar. 13, 2009, 7 pages.
Brumbaugh-Duncan, C., "Th Flash™ MX Project," New Riders Publisher, Jul. 26, 2002, pp. 1-20, Chapter 2, Safari Books Online, [online] [Retrieved on Jul. 10, 2008] Retrieved from the Internet<URL:http://proguest.safaribooksonline.com/0735712832>.
International Search Report and Written Opinion, PCT/US06/21767, Jul. 15, 2008, 13 pages.
International Search Report and Written Opinion, PCT/US06/20550, Jun. 17, 2008, 8 pages.
Chinese Office Action, Chinese Application No. 200480034359.5, Jan. 25, 2008, 10 pages.
PCT International Search Report and Written Opinion, PCT/US06/21937, Sep. 25, 2007, 8 pages.
PCT International Search Report and Written Opinion, PCT/US06/20548, Sep. 19, 2007, 10 pages.
Supplementary European Search Report, EP 04717485, Nov. 7, 2006, 3 pages.
Notification of International Search Report and Written Opinion, PCT/US04/39253, Dec. 13, 2005, 13 pages.

* cited by examiner

ASSIGNING VALUE TO ELEMENTS CONTRIBUTING TO BUSINESS SUCCESS

RELATED APPLICATIONS

This application claims priority from U.S. Provisional Application Ser. No. 60/523,979, dated Nov. 20, 2003, entitled "Enhanced Visitor Behavior Tracking," and U.S. Provisional Application Ser. No. 60/536,558, dated Jan. 14, 2004, entitled "Assigning Value to Contributing Elements," this application is a continuation-in-part of pending U.S. application Ser. No. 10/794,809, filed Mar. 3, 2004, entitled "Associating Website Clicks with Links on a Web Page," which claims priority from U.S. Provisional Application Ser. No. 60/452,084, dated Mar. 4, 2003, entitled "Associating Website Clicks with Links on a Web Page," and U.S. Provisional Application Ser. No. 60/452,085, dated Mar. 4, 2003, entitled "Delayed Data Collection Using Web Beacon-Based Tracking Methods,"; and this application is related to U.S. application Ser. No. 10/608,515, filed Jun. 26, 2003, entitled "Efficient Click-Stream Data Collection", which claims priority from U.S. Provisional Application Ser. No. 60/393,003, dated Jun. 28, 2002, entitled "Collecting Click-Stream of Users on a Website"; the contents of the aforementioned patent applications are incorporated herein by reference.

FIELD OF THE INVENTION

The present invention is related to tracking website usage as it correlates with business success, and more particularly to accurately identifying and associating business success with elements activated by a user during the course of navigating a website.

DESCRIPTION OF THE BACKGROUND ART

One of the most common sales mantras is "know your customer." This basic tenet of selling has grown far beyond knowing who enters the store; it requires among other things, knowing what attracts customers, what they look at, how they move around a marketplace, and how long they stay. By studying customer buying habits, retailers have been able to maximize their revenues through tailoring their promotions, offerings, and even store layouts to suit their customers' preferences and habits.

For bricks-and-mortar sellers of goods and services, gathering such data rapidly becomes cost-prohibitive. Identifying basic information about customer behavior at the check-out stand may be fairly cost-effective; but monitoring a customer's path through the store or how long customers spend selecting a particular product requires much more expensive monitoring. In contrast, such behavioral tracking in the on-line environment occurs without significant increases in cost, thus making complex data collection not only possible, but a requirement to remain competitive.

In an on-line environment, website usage and other customer behavior may be tracked by a website server, or by another server such as a data collection server (also known as a data collector), which may be remotely located. The data collection server is notified of activity on a website so that it can monitor and track the activity. One method of achieving this notification is through the use of a request for embedded content.

Embedded content is part of a web page, such as an image, that is requested as a separate file from the file containing the web page. The separate file may be requested from the website server or from a remote server, such as a remote content server or data collection server. For example, when a user requests a web page from a website server, the website server sends the web page file to the user's client. The client, such as a web browser, then attempts to render the file as a viewable web page. However, upon rendering the web page file, the client may find a reference to a separate file located on the website server or a remote server. After the content is located and sent to the client, the client renders the separate file containing the embedded content along with the original web page.

A web beacon (also known as a web bug) is a particular type of embedded content where the content itself is irrelevant, but the request for content carries useful information. For example, a web beacon is often a transparent image having very small dimensions, such as 1 pixel by 1 pixel. This image is small enough to be invisible to the user both visually and with respect to its effect on perceived response time. When a client is rendering a web page that includes a web beacon, the web beacon causes the client to send a resource request to a server such as a data collection server. The web beacon may include a script (or other code) that causes the client to include, in the resource request, additional information about the user and the user's environment. The additional information can include the data from a cookie, or other information about the client's operating environment or status. Where the server indicated by the web beacon code is a data collection server, the data collection server may, in response to the request, cause the client to set an additional cookie for identification for tracking purposes. In this manner, the web beacon request can be used to indicate to a data collection server that a particular web page is being rendered.

One method for including the request is to write the request as a static image tag in Hypertext Markup Language (HTML). The following is an example of an image tag in HTML:

<imgsrc="http://ad.datacollectionserver.com/
tracker.exe?AID=14658&PID=259294&banner=0.gif"
width=1 height=1 border=0>

Here, the term "ad.datacollectionserver.com" refers to the address of the data collection server.

Another common method of including the request is to use a scripting language such as JavaScript so as to cause the browser to dynamically generate a request to the data collection server. One advantage of using a script instead of a static image tag is that the script can cause the browser to perform other functions including gathering additional data and sending it along with the request. In either case, the result is a request sent to the data collection server upon the occurrence of an event, such as the loading and rendering of a web page.

Once the request has been sent to the data collection server, the data collection server can perform various types of tracking functions. For example, the data collection server can count the number of requests associated with a web page so as to monitor traffic on the web page. By counting the number of times the web beacon element has been requested from the data collection server, the server can determine the number of times a particular page was viewed. By using JavaScript to dynamically construct the request for the web beacon and encode additional information, other identifying information can be obtained for further analysis.

Other types of website usage tracking are also well known, such as for example log file analysis. In such an approach, statistical analysis is performed on server logs in order to detect and analyze website traffic and usage patterns.

In addition to tracking web page visits, it is often desirable to track user actions, such as element activations, on web pages. In general, existing approaches for collecting and tracking website usage fail to provide a means for tracking the actual links a user clicks on during the course of navigating a site and/or fail to provide a connection between the links and return on investment. In some circumstances, the link clicked on can be inferred if the start page has only one link that leads to the destination page. However, where there is more than one link between pages, the determination of which link was clicked, and thus which link contributed to a sale, is more difficult or impossible. Additionally, even when there is only one link, it is often difficult or impossible to determine whether the user actually clicked on the link or navigated to the page via some other method (such as typing in the URL).

Such information is useful in many ways, including for example collecting feedback that leads to improved web page design, determining the effect of various degrees of prominence of links and graphic elements on web pages, and determining the contribution of individual links to an eventual sale. What is needed, then, is a method and system for reliably and accurately tracking the actual links a user clicks on (and other elements the user activates) during the course of navigating a site. What is further needed is a mechanism for automatically and uniquely identifying links on a page so that the user's interactions with the links can be accurately tracked. What is further needed is a mechanism for associating the sales from a website with the links. What is further needed is a mechanism for accurately reporting web page element usage and value statistics. What is further needed is an improved report format that visually depicts web page element usage and valuation statistics.

SUMMARY OF THE INVENTION

According to the present invention, elements (such as pages or links) on a website are uniquely identified. The invention tracks the user's click-stream by collecting data via requests for resources on a website. The invention also determines when a user's session has ended; upon reaching the end of the session, it stores the session as a complete history of the user's use of the resources on a website.

Using the combination of these indicia, the present invention allows a tracking system to associate clicks on various elements of a website with the success of the site, for example, using sales or orders generated on the site. Specifically, the present invention determines the elements contributing to the success of a website and assigns a fraction of the success value to each element using one of three methods: allocation, participation, and allocated participation.

Using the allocation method, the present invention allocates "total success" of a site among elements contributing to the success of the site and allows for adjusting the weighting of elements based on their position in a series of elements. Using the participation method, the present invention evaluates how extensively individual elements, such as web pages or links, participate in the overall success for a website. Using the allocated participation method, the present invention combines the features of the allocation and participation methods to evaluate how subunits of some larger entity are driving success and affecting return on investment by using both independent and dependent variables.

By identifying the value associated with elements according to the techniques of the present invention, the present invention can more accurately detect, record, and analyze user actions on a website with respect to return on investment. A report can then be generated, showing indications of the relative value of various elements on a website by superimposing visual indicators, such as color-coded shading, on a representation of a page of the website.

The Figures depict a preferred embodiment of the present invention for purposes of illustration only. One skilled in the art will readily recognize from the following discussion that alternative embodiments of the structures and methods illustrated herein may be employed without departing from the principles of the invention described herein.

DESCRIPTION OF AN EMBODIMENT OF THE INVENTION

System Architecture

Figure 1:
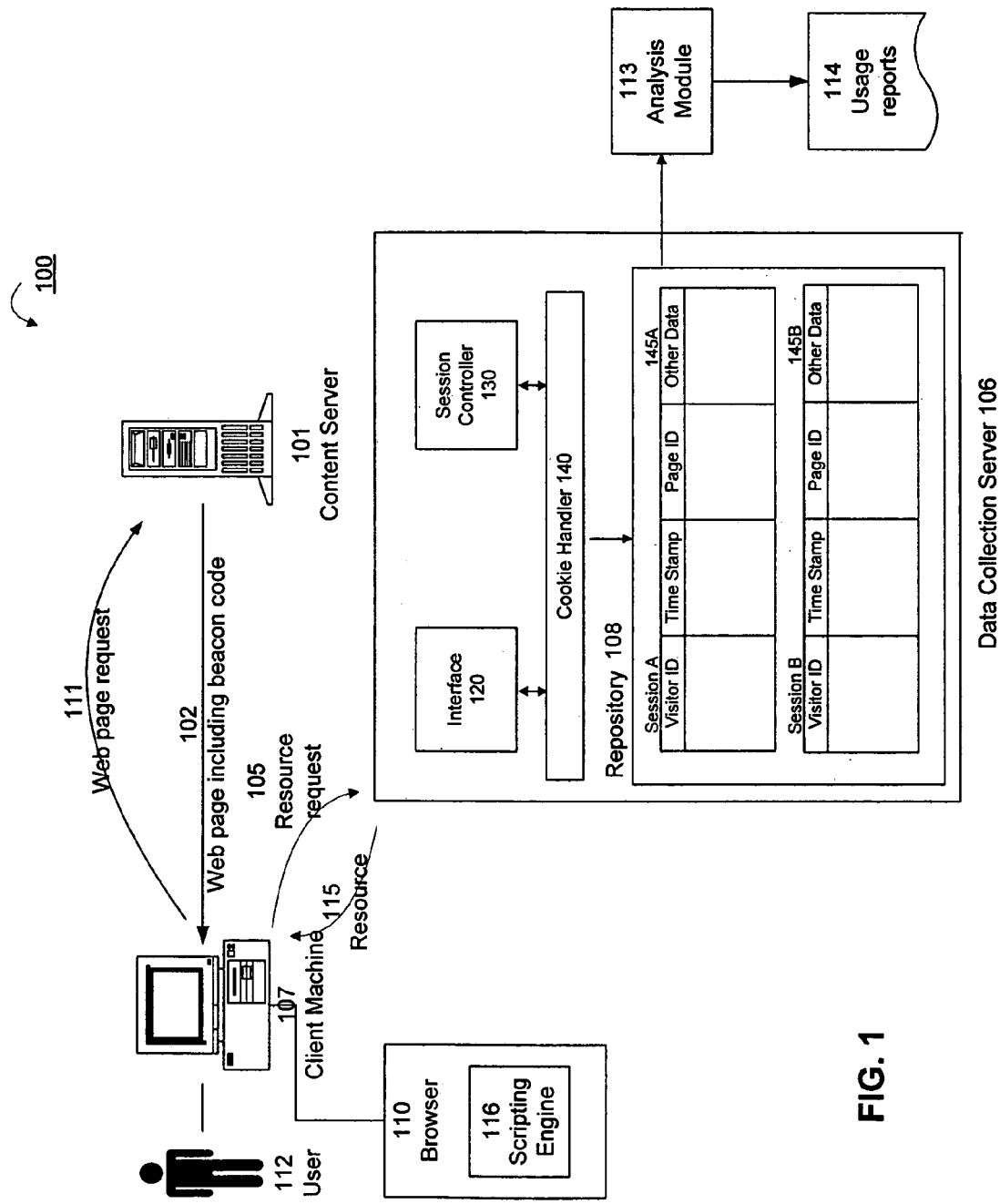
FIG. 1 is a block diagram depicting a system for website traffic data collection.

Referring now to FIG. 1, there is shown a block diagram depicting a system 100 for website traffic data collection according to one embodiment of the present invention. The system 100 includes a client machine 107, a content server 101, a data collection server 106, and an analysis module 113.

A client machine 107 may be an ordinary personal computer, including well-known components such as a CPU running an operating system such as Microsoft Windows, a keyboard, mouse, display screen, and Internet connection (not shown). A user 112 interacts with client machine 107, which runs a software application such as a browser 110 for accessing and displaying web pages. client machine 107 may run various software applications in addition to browser 110. Browser 110 includes scripting engine 116, such as JavaScript, as is commonly found in commercially available browsers.

Content server 101 is a computer or device that receives web page requests 111 transmitted using well known network protocols, such as TCP/IP and HTTP, for communication across the Internet from, and transmits web pages 102 to, client machine 107. In one embodiment, web page 102 includes beacon code, which is a pointer to a beacon (such as a 1 pixel by 1 pixel transparent image). The beacon is typically invisible to the user, such as a transparent one-pixel image. For purposes of the following description, a beacon is any element that is embedded in a web page 102 that is loaded automatically by browser 110 that references a data collection server 106 and is used to monitor traffic. The beacon code can be provided as a script (such as a JavaScript script) to be executed by scripting engine 116.

Data collection server 106 is a computer or device that receives resource requests 105 transmitted using well known network protocols, such as TCP/IP and HTTP, for communication across the Internet from, and transmits resources 115 to, client machine 107. Data collection server 106 includes an interface 120, a session controller 130, a cookie handler 140 and a repository 108. The interface 120 provides a connection internal to the data collection server 106 to the cookie handler 140. The interface 120 sends and receives requests and identifiers to and from the client machine 107. The cookie handler 140 is connected to the session controller 130 and the repository 108. The repository 108 records resource requests 105 and may also record additional information associated with the request (such as the date and time, and possibly some identifying information that may be encoded in the resource request). For illustration purposes, the repository 108 includes two sessions, session A (145A) and session B (145B). More or fewer sessions may be included in alternative embodiments.

Analysis module 113 may be implemented in software running on data collection server 106 or on another computer that can access repository 108. Analysis module 113 retrieves stored tracking data from repository 108, which it analyzes to detect various patterns of user behavior. In one embodiment, the analysis module 113 categorizes and orders the data in any manner useful to website operator. The analysis module 113 also filters the data, and outputs reports 114. Reports 114 may be provided in hard copy, or via a display screen (not shown), or by some other means. Reports 114 include, for example, overviews and statistical analyses describing the relative frequency with which various site paths are being followed through the website.

Data Flow

Figure 2:
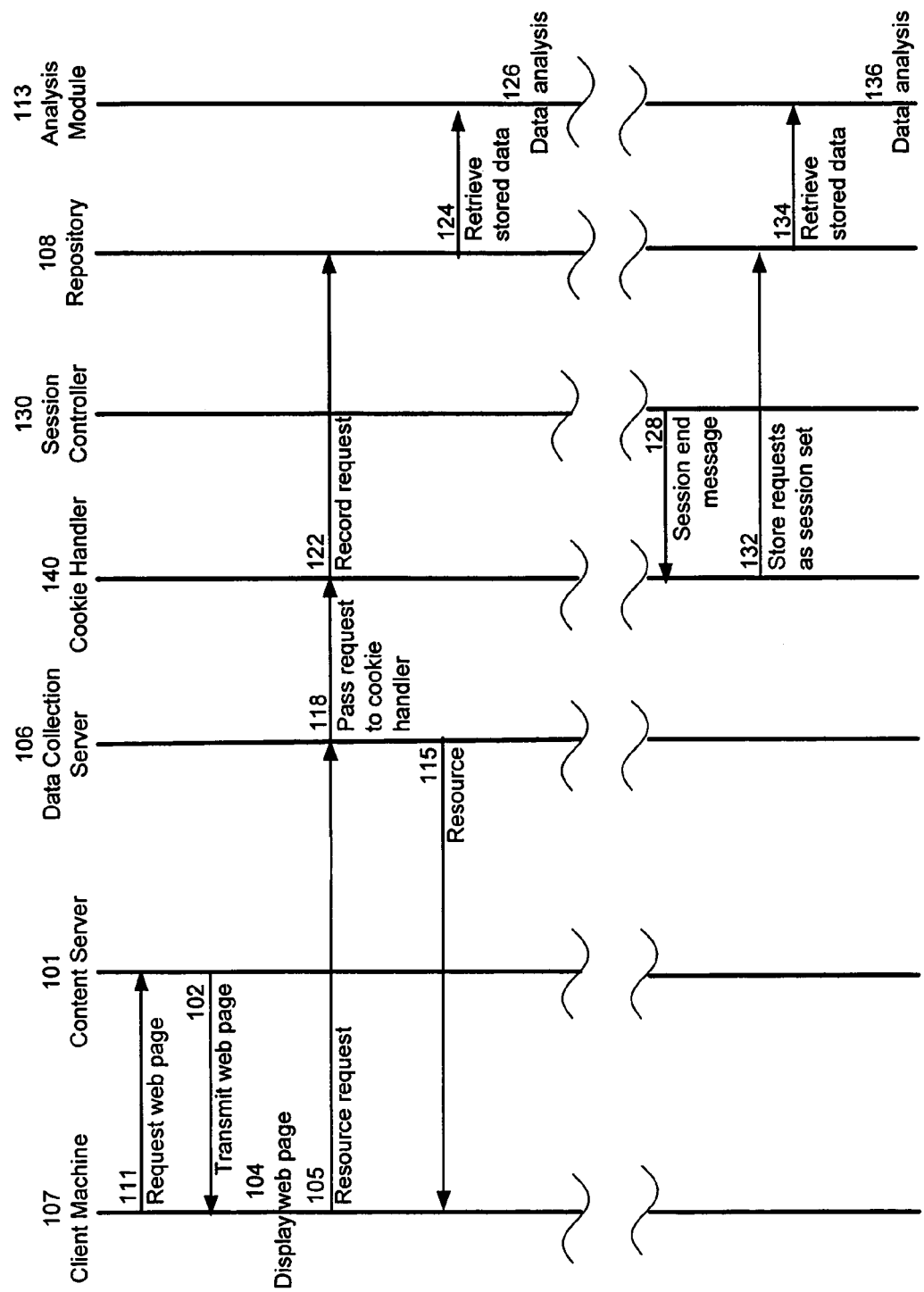
FIG. 2 is an interaction diagram illustrating how data is passed between the various elements of a system for website traffic data collection.

Referring now to FIG. 2, with continued reference to FIG. 1, there is shown an interaction diagram illustrating how data is passed between the various aspects of a system 100 for website traffic data collection according to one embodiment of the present invention.

In response to a user 112 action such as clicking on a link or typing in a URL, client machine 107 issues a web page request 111 that is transmitted via the Internet to content server 101. In response to request 111, content server 101 transmits web page 102 (in the form of HTML code, for example) to client machine 107. Browser 110 displays 104 the requested web page 102 on client machine 107.

The web page 102 contains beacon code as described above. The beacon code causes client machine 107 to generate resource requests 105 to data collection server 106. These resource requests 105 are usually dynamically generated according to the script instructions. The data collection server 106 receives the request via the interface 120 and passes 118 the request to the cookie handler 140. The cookie handler 140 records 122 the request for embedded content in the repository 108. Data collection server 106 also transmits the requested resource 115 to client machine 107 so that the resource request is satisfied.

The repository 108 stores the requests by visitor identifier, time stamp and page identifier along with any other data received with the request. For example, a particular request may be recorded as follows:

TABLE 1

| Visitor Identifier | Time Stamp | Page Identifier | Other Data |
|---|---|---|---|
| visitor1234 | 12:08 pm, May 2, 2003 | www.booksales.com/page1 | vj3-7gpy-397 |

The visitor identifier, such as a cookie or other identifying object, is a unique identifier created by the cookie handler 140. The visitor identifier may be persistent or set to expire upon the occurrence of some event or elapsed time frame. Furthermore, the visitor identifier may include only a unique identifier, or may also include other data such as time stamp, page identifier and other data, which may be sent along with the request for the web beacon. The process of using and generating cookies is described in co-pending application Ser. No. 10/608,515, which is incorporated in its entirety herein by reference.

The visitor identifier may be sent to the client machine 107 for further communications with the data collection server 106 or may be assigned by the cookie handler 140 and recorded directly by the repository 108 along with the other request data. The time stamp may be assigned by the data collection server 106, or by the client machine 107 and passed to the data collection server along with the request. The page identifier indicates the website and resource that the client was rendering when the request was made. Other data may include a range of data, including but not limited to, identification of last page viewed by user, time spent viewing a particular page, custom-designed data strings, data from a transaction occurring on the website, and other data of interest to website operators.

Analysis module 113 retrieves 124 stored tracking data from repository 108, analyzes 126 the data, and outputs reports 114. Examples of such reports are described below.

The cookie handler 140 also communicates with the session controller 130 to determine whether the user's session has ended. Several criteria can be used to determine whether a session has ended. One criterion may be the amount of time elapsing between page views. For example, after a certain amount of time has elapsed, the user may be assumed to have left the computer or shut down his client, having completed his session. The session controller 130 can then signal 128 the cookie handler 140 that the user has likely completed his session.

Another method of determining the end of a session is to assign an end of session value to a particular event. Such an event may be, for example, when a user completes a purchase transaction by visiting a check-out page. Upon observing the request from the check-out page, the session controller can indicate 128 to the cookie handler 140 that the session has completed.

Upon declaring the end of a user's session, the session controller 130 instructs the cookie handler 140 to store 132 the requests collected as a session set, e.g., session A (145A) of FIG. 1, in the repository 108. A session stored in the repository 108 may be organized, for example, as follows:

TABLE 2

| Visitor Identifier | Time Stamp | Page Identifier | Other Data |
|---|---|---|---|
| visitor1234 | 12:08:15 pm, May 2, 2003 | www.booksales.com/page1 | vj3-7gpy-397 |
| visitor1234 | 12:10:32 pm, May 2, 2003 | www.booksales.com/page2 | 2:17 |
| visitor1234 | 12:10:35 pm, May 2, 2003 | www.booksales.com/page1 | Fiction |
| visitor1234 | 12:11:51 pm, May 2, 2003 | www.booksales.com/page3 | scroll_down |
| visitor1234 | 12:12:18 pm, May 2, 2003 | booksales.com/checkout | $14.95 |

One method of ordering the data is to categorize each request and associated data by visitor identifier and list these entries in ascending order of time. Table 2 represents the click-stream of the user with visitor identifier "vistor1234" as the user navigated the booksales.com website. Other methods of categorization and ordering may be used to achieve other storage efficiencies.

The data again can be retrieved 134 by the analysis module 113 to analyze 136 various patterns of user behavior. The data analysis program can categorize and order the data in any manner useful to a website operator, as further described below. In this manner, the data can be studied to determine the most effective website organization and promotional programs, among other things.

Method

Figure 3:
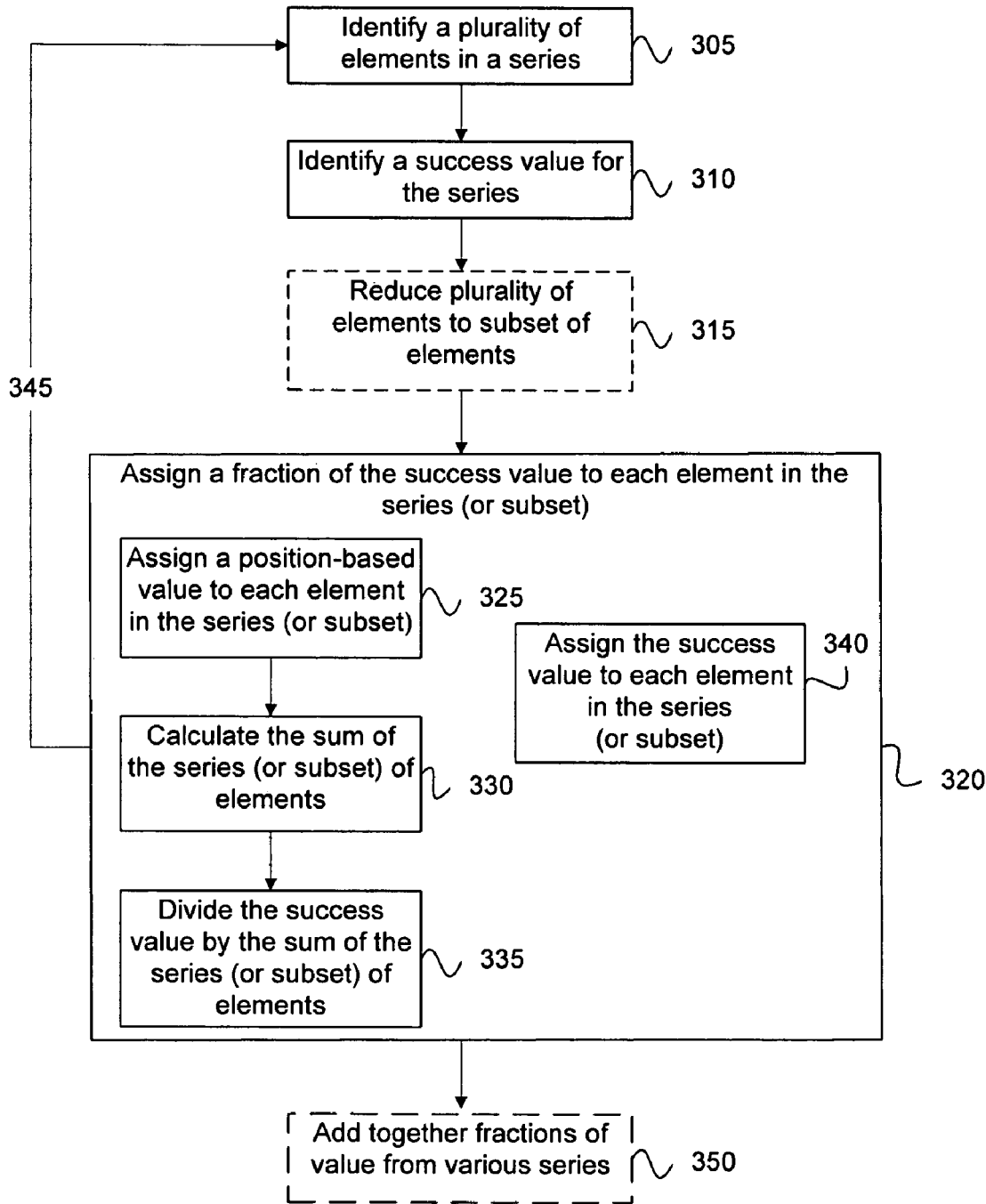
FIG. 3 is a flowchart detailing a value analysis process performed by a system for website traffic data collection.

Referring now to FIG. 3, there is shown a flowchart detailing a value analysis process performed by a system for website traffic data collection according to one embodiment of the present invention. To begin the process, a plurality of elements in a series is identified 305. For example, the elements may be links on a web page or within a website, and the series may be the user's click-stream as s/he navigates the web pages or website. The process of identifying elements or objects on a web page is described in co-pending application Ser. No. 10/794,809, which is incorporated in its entirety herein by reference. In one embodiment, the elements are web pages or links associated with a website and the series takes place during a single user session. Next, a success value is identified for the series 310. In the above example, the success value is associated with the "success" resulting from the user session, such as a dollar value corresponding to sales or a number of orders or products added to a cart. In one embodiment, the plurality of elements is reduced to a subset of elements 315 in an optional step. In one example, the reduction entails eliminating all duplicative elements, for example, if the user visited Page A three times in the session, Page A would get credited with just one visit. In another example, duplicative elements would be eliminated only if they occurred consecutively, e.g., if the user clicked on a link for a "help" page twice in a row. In another embodiment, no reduction would take place, e.g., if no items in the series are duplicates. Finally, a fraction of the success value is assigned to each element in the series or subset 320.

In one embodiment, the assignment step 320 further comprises assigning a position-based value to each element in the series or subset 325. In one embodiment, the position-based value is used to apply equal or weighted value to elements in the series or subset based on the position of the element in the sequence, e.g., items that are earlier in the sequence may be assigned a higher position-based value. Next, the sum of the series or subset of elements from step 325 is calculated 330 and the success value is divided 335 by the sum from step 325.

In another embodiment, the assignment step 320 further comprises assigning the success value from step 310 to each element in the series or subset 340. For example, if the success value was 10 and the user visited pages A, B, and C, page A would get assigned a value of 10, page B would get assigned a value of 10, and page C would get assigned a value of 10. Following the assignment step 320, in some embodiments the process repeats 345 and the fractions assigned to the elements for each series are added together 350. Specific examples of the above method follow.

The above process examines individual elements in a user session with respect to what data is pertinent to the website owner. For example, the method can be used to examine clicks on a website as related to revenue, orders, or additions to a cart as a measure of business success. Within the above method, there are three different methods by which such data can be used, employing three different algorithms: an allocation method, a participation method, and an allocated participation method, each of which is discussed in greater detail below. The methods below use links and pages as examples of elements for use in the various methods. However, the methods are not limited to this context and in some embodiments elements may include search terms, links on other websites directing customer to the website of interest, banner ads, or campaigns of other types.

Allocation Method

The allocation method allocates "total success" of a site among elements contributing to the success of the site. In addition, this method allows for adjusting the weighting of elements based on their position in a series of elements. Elements can be equally weighted, front weighted (elements earlier in the sequence receive greater weight), or back weighted (elements later in the sequence receive greater weight).

Figure 4A:
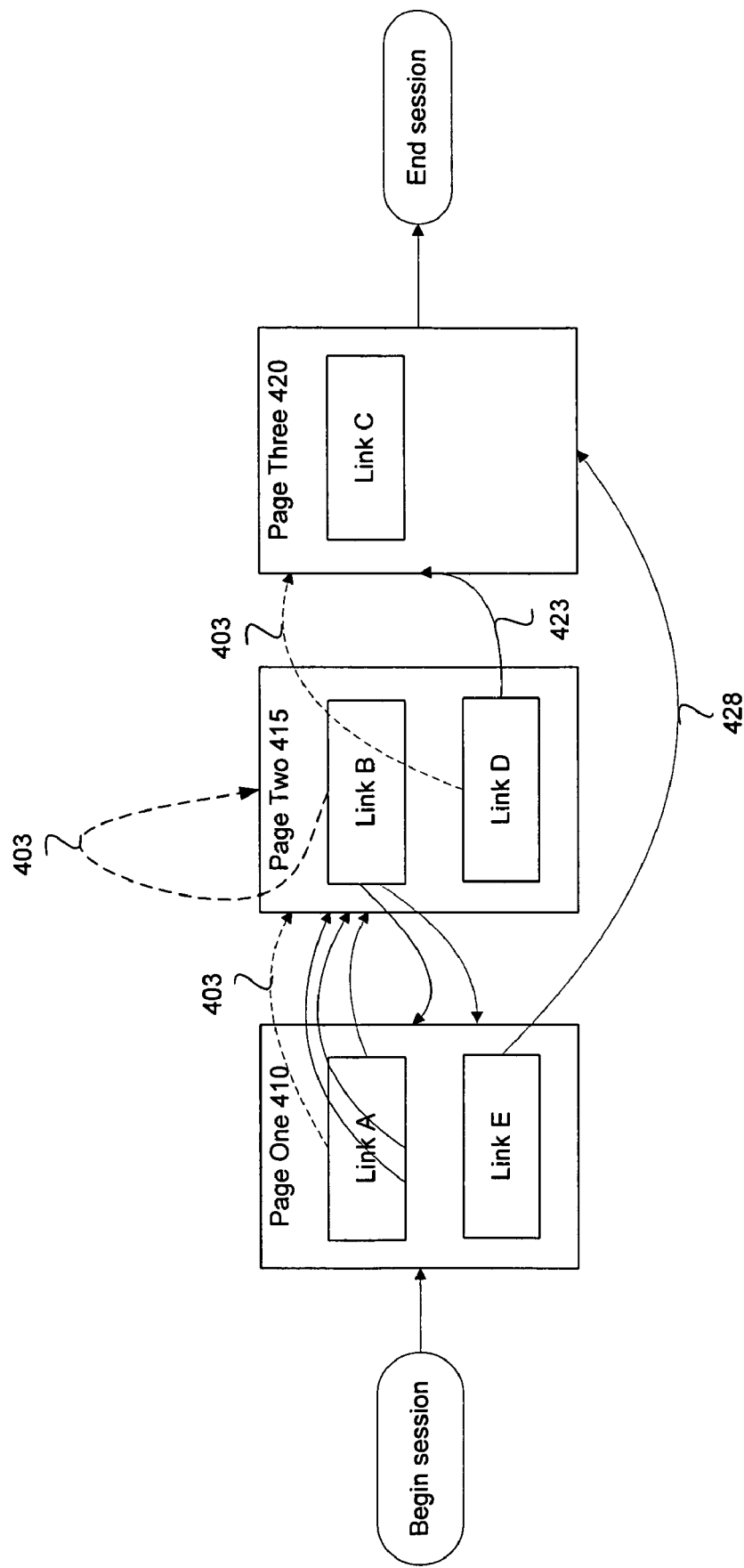
FIG. 4A is a block diagram depicting web pages and links in a user's click-stream during a user session.
Figure 4B:
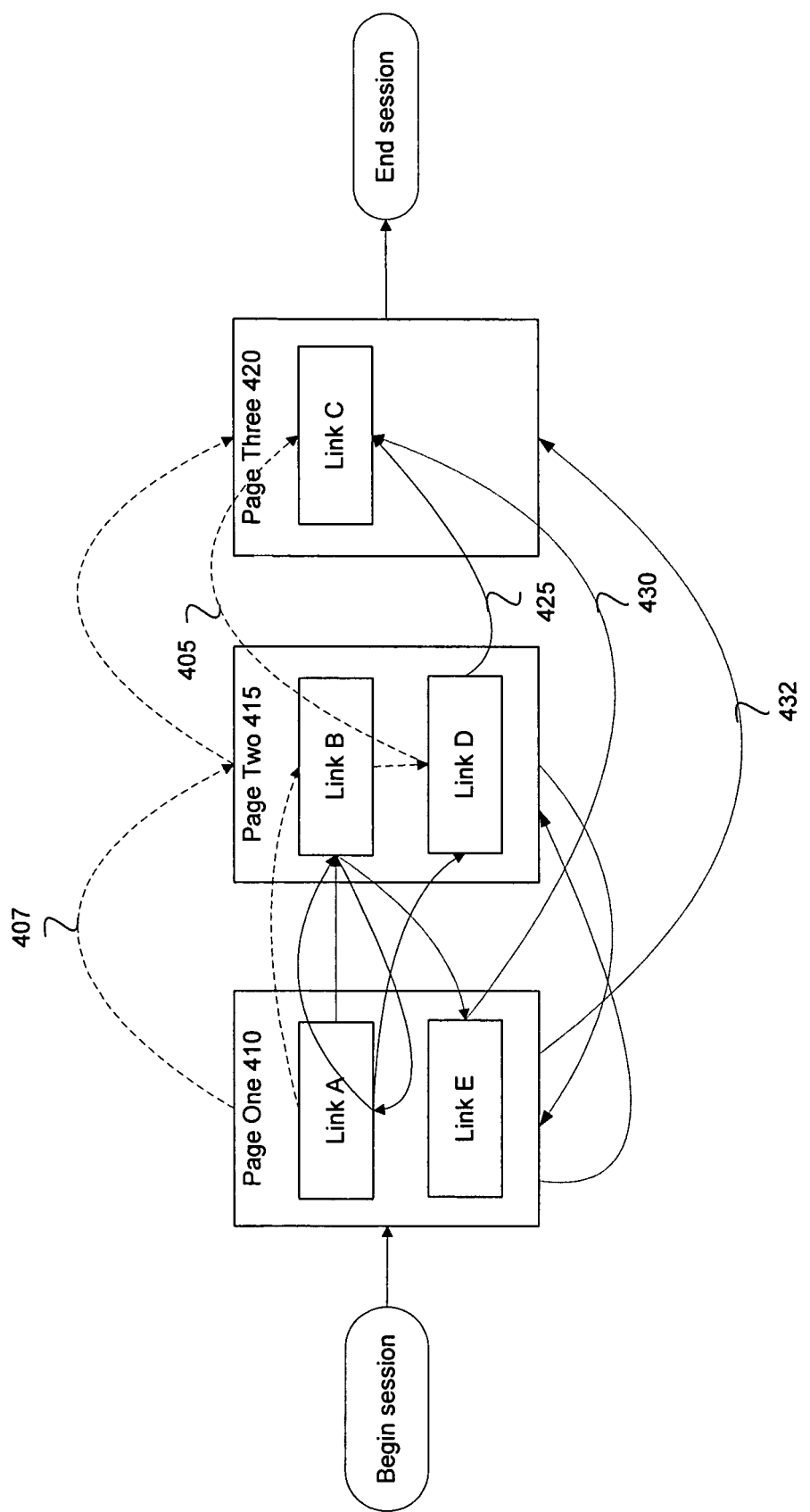
FIG. 4B is a block diagram depicting a sequence of links clicked during a user session.

Referring now to FIGS. 4A and 4B, they show, respectively, block diagrams depicting a user's click-stream navigation and sequence of links clicked during a user session according to one embodiment of the present invention. The allocation method is described with reference to FIGS. 4A and 4B, with continued reference to FIG. 3.

The allocation method begins with identifying items in a series 305. In one example of the allocation method, a user visits the following links on pages in the following order, represented by path 403 of FIG. 4A (shown as a dashed line): Link A on Page One (410) (takes the user to Page Two), Link B Page Two (415) (opens a separate help page, which user then closes), Link D on Page Two (415) (takes the user to Page Three 420). Thus, links the user clicks on are, in order, Link A, Link B, Link D, Link C, represented by dashed line 405 of FIG. 4B, and the pages the user visits are, in order, Page One, Page Two, Page Three, represented by dashed line 407 of FIG. 4B.

Assuming a success factor (310) of 100 (this may be $100, 100 orders, etc.). The allocation value of each page would be calculated as follows. This example tracks visits to particular pages, however, in other embodiments specific links are tracked instead. The plurality of elements is reduced 315 by removal of any duplicate items occurring consecutively in the sequence. The second and third elements in the sequence are duplicates (both links are on Page Two), thus, the useful elements are Page One, Page Two, Page Three. Then a fraction of the success value is assigned to each element in the subset 320. In this example, each item is assigned a value from a function based on the position of the element in the sequence (hereinafter "pos") 325. The simplest example weights equally all elements in the sequence, i.e., F=1. Thus, for the algorithm: F(Page One)+F(Page Two)+F(Page Three) =total success value, the success factor merely is divided by the number of elements in the sequence to determine the allocation (330, 335). For example, using a success factor of $100 and the sequence above, the allocations would each be 100/3, i.e., Page One=$33, Page Two=$33, and Page Three=$33 (rounding to whole dollars).

Elements also can be front or back weighted. To front weight, or give greater value to items occurring earlier in a sequence, a function of F =1/pos is used for each element and the elements are added. Thus, the algorithm for the above example is:

$F$(Page One)+$F$(Page Two)+$F$(Page Three)=total success value

1/$pos$(Page One)+1/$pos$(Page Two)+1$pos$(Page Three) =$100 (total success value)

Thus, $F$(Page One, visited first)=1/1; $F$(Page Two, visited second)=1/2; $F$(Page Three, visited third) =1/3

I.e., 1$x$+1/2$x$+1/3$x$=$100

Next, the algorithm is solved for x:

$6/6x+3/6x+2/6x=\$100$ $6x+3x+2x=\$600$ $11x=\$600$ $x=\$54.55$

Then, the respective F values are calculated, resulting in the following allocation values:

Page One: $1x=\$55$, Page Two: $1/2x=\$27$, and Page Three: $1/3x=\$18$ (rounding to whole dollars).

To back weight, or give greater value to elements later in the sequence, a function of F=pos is used for each element and the elements are added. Thus, the algorithm for the above example is:

F(Page One)+F(Page Two)+F(Page Three)=total success value pos(Page One)+pos(Page Two)+pos(Page Three)=$100(total success value)

Thus, F(Page One, visited first)=1; F(Page Two, visited second)=2; F(Page Three, visited third)=3

I.e., $1x+2x+3x=\$100$

Next, the algorithm is solved for x:

$6x=\$100$ $x=\$16.67$

Then, the respective F values are calculated, resulting in the following allocation values: Page One: $x=\$17$, Page Two: $2x=\$33$, and Page Three: $3x=\$50$ (rounding to whole dollars).

Using the allocation method as described above, it can be determined which pages in a series or user session affected the success of the website. The weighting aspect of the method allows increased weight to be placed on elements occurring earlier or later in the series. This aspect of the invention is especially advantageous when it is known, for example, that pages viewed earliest in a visit to a site have a greater influence on generating sales.

In another embodiments, clicks on specific links are tracked instead of visits to web pages, and the links are allocated value in the same manner as above.

Participation Method

The participation method evaluates how extensively individual elements, such as a web page or a link, participate in the overall success of a website. Specifically, the method highlights what percentage of overall success is "touched" by the individual element.

As with the allocation method, the participation method begins with identification of a plurality of elements in a series 305. For example, a user clicks on the following links in the following order, represented as path 423 of FIG. 4A (shown as a solid line): (1) Link A on Page One (410) (takes the user to Page Two), (2) Link B on Page Two (415) (takes the user back to Page One), (3) Link A on Page One (410) (takes the user to Page Two again), (4) Link D on Page Two (takes the user to Page Three), and (5) Link C on Page Three (420) (takes the user to checkout). Thus, the links clicked, in order, are: Link A, Link B, Link A, Link D, Link C, represented by solid line 425 of FIG. 4B, resulting in a success factor of 10 (310). In one embodiment, this may be $10. In another embodiment, this may be 10 orders or 10 items placed in a cart. The participation value of each link is calculated as follows. First, any duplicate items are removed from the series 315, regardless of whether the items are consecutive or not. The purpose of this step is to avoid giving a specific page or link a value greater than the overall success value. In this example, items (1) and (3) are duplicates. Thus, the useful items are (1) Link A on Page One (410), (2) Link B on Page Two (415), and (4) Link D on Page Two (415), and (5) Link C on Page Three (420). Note that the duplicate click on Link A (3) was removed. Then a fraction of the success value is assigned to each element in the subset 320. In this example, each item in the sequence is assigned the full value (or 1/1) of the transaction, in this case 10. Thus, the participation value for the respective links are Link A=10, Link B=10, Link D=10, and Link C=10 for this transaction.

One way that these values can be used is to sum the participation values for each link for multiple series, e.g., for all visitors to a website, and show it as a percentage of the total success realized by the site 350. For example, assuming the following data from additional users, each separately calculated using the method above: Link A has a participation value of 70 from other users, Link B has a participation value of 20 from other users, Link D has a participation value of 40 from other users, and Link C has a participation value of 83 from other users. Thus, Link A has a participation value of 80 for all visitors to the web site (i.e., 10 from the example above, 70 from other users), Link B has a participation value of 30 for all transactions, Link D has a participation value of 50, and Link C has a participation value of 93 for all visitors to the site. If the site had a success value of 100 total from all users, the respective percentage of total success for each link would be Link A=80%, Link B=30%, Link D=50%, and Link C=93%. In other words, Link C participates in, or "touches," 93% of the total success realized by the site. Another way to use the participation value information is to show the "success units" (dollars, orders, sign-ups, etc.) associated with the links. From the above example, there are 80 "success units" from Link A, 30 "success units" from Link B, 50 "success units" from Link D, and 93 "success units" from Link C.

Using the participation method as described above, it can be determined which pages or links in a series or user session "touch" the success of the website. This aspect of the invention is especially advantageous for determining what factors, for example which links, most often contribute to sales. For example, a high participation value associated with a link corresponding to more detailed information about the product (e.g., 93%, as Link C above) may indicate that the return policy encourages sales, whereas a low participation value associated with a link corresponding to a help page (e.g., 30%, as Link B above) may indicate that the help page is not user-friendly. Using this type of information, the website owner can make decisions about changes to improve sales through changes to the website.

Allocated Participation Method

The allocated participation method evaluates how subunits of some larger entity are driving success by using both independent and dependent variables. The algorithm begins with a bound sequence with an independent data set and a dependent data set (for each value of the independent there is a dependent value). An example of this would be using pages visited as the independent value and the link clicked on in the page as the dependent value. Next, a participation analysis is performed for the independent part of the series (page) as described in the participation method above. Then, dependent values (links) are grouped together by their independent counterparts. For the dependent items grouped together by a common independent value, allocate the participative value across them as described in the allocation method above.

As above, the method begins with identifying a plurality of elements in a series 305. For example, a user clicks on the following links in the following order, represented by path 428 of FIG. 4A (shown as a dotted line): (1) Link A on Page One (410) (takes user to Page Two), (2) Link B on Page Two (415) (takes user back to Page One), (3) Link E on Page One (410) (takes user to Page Three), and (4) Link C on Page Three (420) (takes user to checkout). Thus, links the user clicks on are, in order, Link A, Link B, Link E, Link C, represented by dotted line 430 of FIG. 4B, and the pages the user visits are, in order, Page One, Page Two, Page Three, represented by dotted line 432 of FIG. 4B.

Assuming a success factor (310) of 100 (this may be $100, 100 orders, etc.). The allocated participation value of each page would be calculated as follows. First, using only the (independent variable) page information, a participative analysis is performed as above. First, looking only at the pages, Page One (410)-Page Two (415)-Page One (410)-Page Three (420) is reduced (315) to Page One (410)-Page Two (415)-Page Three (420). Then, each page is assigned (340) a value of 100: Page One=100, Page Two=100, Page Three=100. Next, the (dependent) link values for each page (independent) are grouped. In this example, Links A and E would be grouped by Page One, Link B would be grouped by Page Two, and Link C grouped by Page Three. Assuming an equal weight allocation (as opposed to front weighted or back weighted, as described above), Page Two, Link B and Page Three, Link C each would be allocated a value of 100 (100/1) and Page 1, Links A and E each would be allocated a value of 50 (100/2) (steps 325-335). Thus, the final results are: Page One, Link A=50, Page Two, Link B=100, Page One, Link E=50, and Page Three, Link C=100.

Using the allocated participation method as described above, it can be determined which pages and links in a series affect the success of the website. This aspect of the invention is especially advantageous when the website comprises multiple links on multiple pages.

Thus, the above methods and algorithms provide valuable information to the website owner with respect to which elements of a site are driving success and affecting return on investment. To provide further visibility of such information, the information is displayed in the form of reports, such as the one described in FIG. 5.

Output Format

Figure 5:
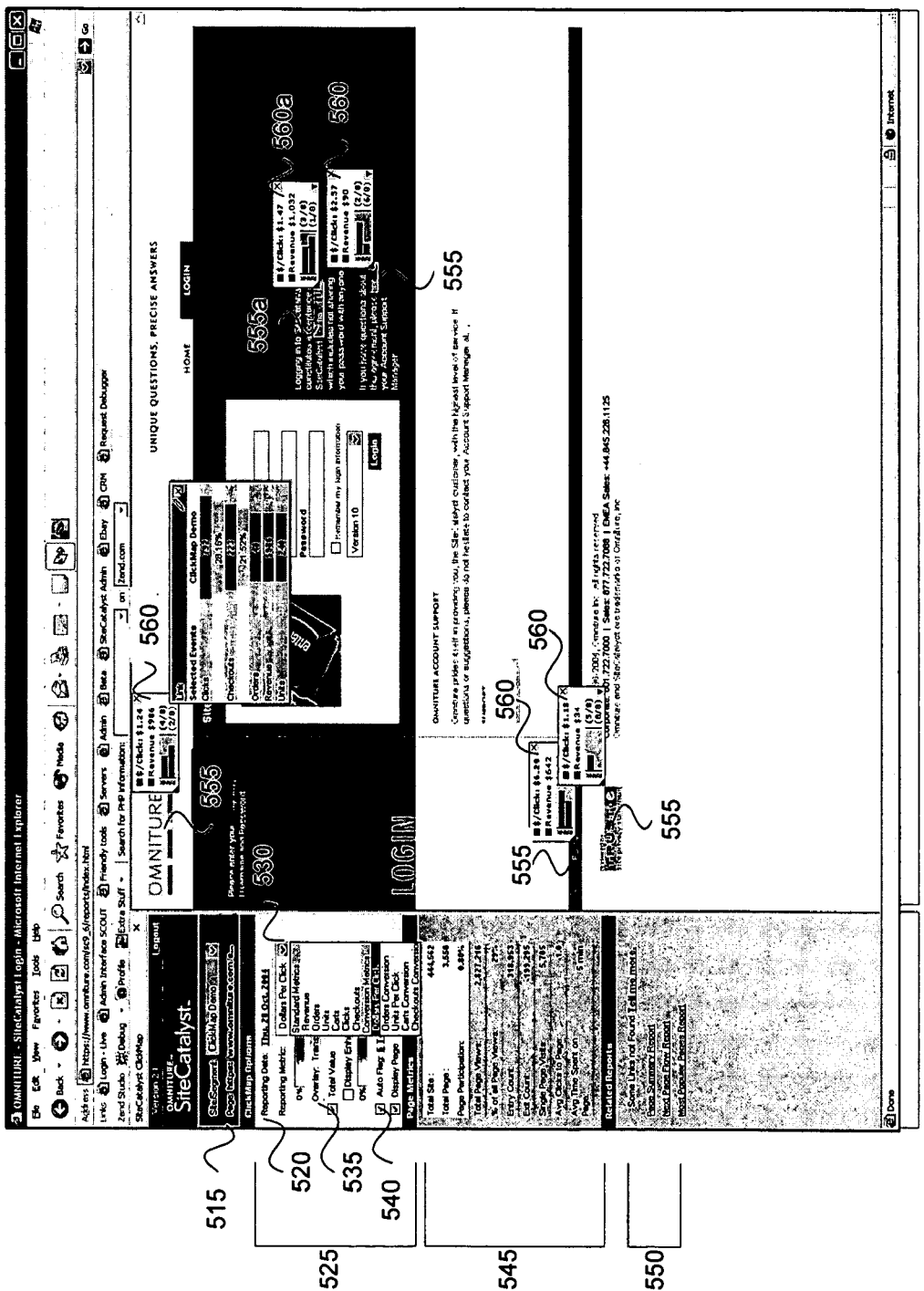
FIG. 5 is an example of a page analysis report and an image of a web page being analyzed in the report.

Referring now to FIG. 5, there is shown an example of a page analysis report 505, displayed alongside an image of the web page 510 being analyzed. In one embodiment, report 505 is provided to a site administrator or owner interacting with data collection server 106.

In one embodiment, such as displayed in FIG. 5, report 505 includes identification 515 of the website and web page being analyzed, such as the URL or web address for the web page. The report 505 also includes a report date 520 and various report options and settings 525. For example, in this section the user may select the reporting metric 530 to display in conjunction with the web page 510 analyzed. In the depicted example, the selected metric is Dollars Per click, shown highlighted in the reporting metric 530 drop-down menu. In addition, the report options and settings section 525 includes an overlay opacity selector 535, which allows the user to control the relative transparency or opacity of the overlay and an automatic display selector 540, which allows the user to select a number of top items for which the selected reporting metric 530 is automatically displayed. A page metrics section 545 displays various information about the page, such as participation, average clicks to the page, and average time spent on the page. In addition, the report 505 includes links 550 to related reports. In some embodiments, a visual indication is displayed as a legend to indicate the meaning of various markers; a non-exclusive list includes a color key for superimposed colors, varied font size, foreground colors, highlights, etc.

Turning to the web page 510 and overlay, in one embodiment variable levels and shades of color density are superimposed on the displayed view of web page 510 over clickable elements 555, in order to visually represent the relative number of clicks each element 555 or screen region has received. If the automatic display selector 508 has been enabled, a flag 560 bearing information about an element 555 is displayed next to the element. In this example, the top five elements were chosen in the automatic display selector 540, so the flag is displayed for the top five elements 555. For example, flag 560a automatically displays information regarding dollars per click and revenue for element 555a. The other elements reveal a flag 560 when moused over. In another embodiment, no information is automatically displayed, however, flags 560 are revealed when a user mouses over an element. In addition, information other than the specific metric selected also may be revealed by mousing over an element.

These aspects of the present invention provide greater visibility of the information generated by the above-described methods, providing the website owner valuable insight into which elements of a website are contributing to the success of the site and contributing to return on investment.

One skilled in the art will recognize that other formats and output mechanisms can be used, including for example hard copy output, text or graphical reports, and the like.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer, network of computers, or other apparatus. Various general-purpose systems may be used with programs in accordance with the teachings herein, or it may prove convenient to construct a more specialized apparatus to perform the required method steps. The required structure for a variety of these systems appears from the description. In addition, the present invention is not described with reference to any particular programming language. It will be appreciated that a variety of programming languages may be used to implement the teachings of the invention as described herein.

As will be understood by those familiar with the art, the invention may be embodied in other specific forms without departing from the spirit or essential characteristics thereof. For example, the particular architectures depicted above are merely exemplary of one implementation of the present invention. The functional elements and method steps described above are provided as illustrative examples of one technique for implementing the invention; one skilled in the art will recognize that many other implementations are possible without departing from the present invention as recited in the claims. Likewise, the particular capitalization or naming of the modules, protocols, features, attributes, or any other aspect is not mandatory or significant, and the mechanisms that implement the invention or its features may have different names or formats. In addition, the present invention may be implemented as a method, process, user interface, computer program product, system, apparatus, or any combination thereof. Accordingly, the disclosure of the present invention is intended to be illustrative, but not limiting, of the scope of the invention, which is set forth in the following claims.

What is claimed is:

1. A method of assigning value to an element contributing to the success of a website, comprising:
   identifying a plurality of elements in a series contributing to the success of the website, the series corresponding to a navigation path used by a user to navigate through the website;
   identifying an overall success value associated with the series;
   assigning a position based value to each of the elements in the series previously accessed by the user;
   calculating a sum of the position-based values assigned to each of the elements in the series;
   dividing the success value by the sum of the series of elements to generate a success value contribution for each elements in the series;
   generating a fraction of the success value associated with each element in the series using a relationship between the position-based value assigned to each element in the series and the success value contribution;
   assigning the fraction of the success value to the associated element of the series; and
   generating a report describing a relationship between the fraction of the success value and the associated element of the series.

2. The method of claim 1, wherein the position-based value is equal for all elements in the series.

3. The method of claim 1, wherein for a pair of adjacent elements in the series, the element of the pair nearer the beginning of the series has a position-based value greater than or equal to the element of the pair nearer the end of the series.

4. The method of claim 1, wherein for a pair of adjacent elements in the series, the element of the pair nearer the end of the series has a position-based value greater than or equal to the element of the pair nearer the beginning of the series.

5. The method of claim 1, wherein the fraction of the success value is 1.

6. The method of claim 1, wherein the report includes statistics for valuation of the series of elements.

7. The method of claim 1, wherein the report includes an image representing a web page including the elements in the series, and associates a visual indicator quantifying the fraction of the success value associated with an element of the series with the element of the series.

8. The method of claim 7, wherein the visual indicators are color-coded.

9. The method of claim 1, wherein the series takes place during a single user session.

10. The method of claim 1, wherein the elements are selected from a group of web pages, links, search terms and advertisements.

11. The method of claim 1, further comprising:
   identifying a second plurality of elements in a second series;
   identifying a second success value associated with the second series;
   calculating a second fraction of the second success value associated with each element in the second series previously accessed by the user;
   assigning the second fraction of the second success value to the associated in the second series; and
   adding the value of the fraction of the success value and the second fraction of the second success value for each element in the series and the second series.

12. The method of claim 1, further comprising:
   reducing the plurality of elements to a subset of elements prior to assigning a fraction of the success value.

13. The method of claim 11, further comprising:
   reducing the second plurality of elements to a second subset of elements prior to assigning a second fraction of the second success value to each element in the second series.

* * * * *

UNITED STATES PATENT AND TRADEMARK OFFICE
CERTIFICATE OF CORRECTION

PATENT NO. : 7,603,373 B2  Page 1 of 1
APPLICATION NO. : 10/993397
DATED : October 13, 2009
INVENTOR(S) : Error et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 346 days.

Signed and Sealed this

Fifth Day of October, 2010

David J. Kappos
*Director of the United States Patent and Trademark Office*